United States Patent [19]

Brittain et al.

[11] Patent Number: 5,647,414

[45] Date of Patent: Jul. 15, 1997

[54] CURBSIDE OIL AND OIL FILTER RECYCLE AND COLLECTION APPARATUS AND METHOD

[76] Inventors: Charles Brittain, 8414 San Fernando Rd., Sun Valley, Calif. 91352; Gilbert B. Ross, 17640 Vincennes St., Northridge, Calif. 91325

[21] Appl. No.: 409,377

[22] Filed: Mar. 23, 1995

[51] Int. Cl.$^6$ .................................................. B65B 3/00
[52] U.S. Cl. ................... 141/231; 141/1; 141/98; 141/106; 141/364; 141/375; 220/254; 220/573; 184/1.5; 184/106
[58] Field of Search .................... 141/1, 2, 18, 21, 141/98, 106, 231, 363, 364, 375; 220/254, 306, 308, 571–573; 184/1.5, 106; 137/312, 313, 351, 899, 899.4

[56] References Cited

U.S. PATENT DOCUMENTS

| 381,253 | 4/1888 | Kinports | 220/571 |
|---|---|---|---|
| 505,208 | 9/1893 | Wagandt | 141/364 X |
| 2,199,970 | 5/1940 | Mitchell | 141/98 |
| 2,717,660 | 9/1955 | Reisert et al. | 184/1.5 |
| 2,989,208 | 6/1961 | Gibbs, Jr. | 220/254 |
| 3,810,487 | 5/1974 | Cable et al. | 137/351 |
| 4,823,947 | 4/1989 | Maynard, Jr. | 141/98 X |
| 5,033,520 | 7/1991 | Kuemichel | 141/231 |
| 5,033,637 | 7/1991 | Webb | 220/571 X |
| 5,211,289 | 5/1993 | Matthews | 220/254 X |
| 5,291,921 | 3/1994 | Devine | 141/106 X |
| 5,328,047 | 7/1994 | Smith | 220/308 X |
| 5,415,210 | 5/1995 | Hannah | 141/98 X |
| 5,489,042 | 2/1996 | Ewald | 220/573 |
| 5,499,666 | 3/1996 | Foster et al. | 141/98 |

*Primary Examiner*—J. Casimer Jacyna
*Attorney, Agent, or Firm*—Louis J. Bachand

[57] ABSTRACT

Curbside oil filter and oil recycle apparatus comprising a bucket sized to receive an oil filter and its oil, a support within the bucket to maintain the oil filter in a draining position out of contact with its oil, and a lid closing the bucket top against oil spillage should the bucket be upset, the lid having a removable plug through which the oil filter can be passed, the residual oil in the bucket being removable to a mobile container by suction from the bucket through a conduit passing the filter support.

19 Claims, 5 Drawing Sheets

CURBSIDE OIL AND OIL FILTER RECYCLE AND COLLECTION APPARATUS AND METHOD

TECHNICAL FIELD

This application relates to an environmentally effective, cost efficient and readily adopted curbside recycle system for domestic engine oil and oil filters. More particularly, the invention relates to apparatus and method for the low cost recovery of by-products of household motor oil changes including four to six quarts of used motor oil and a used filter from each change.

BACKGROUND OF THE INVENTION

Do-it-yourself oil changes are increasing in popularity as auto supply stores provide improved equipment to assist the car owner with expeditious removal of used oil, and service stations accept the used oil. This system relies extensively on the diligence of the consumer, particularly in bringing the used oil and oil filter to a service station or other collection point, a highly inconvenient task. Less reliance on the consumer's diligence will likely result in fewer illegally disposed of filters and simply dumped residual oil. A typical oil change involves from 4 to 6 quarts of oil and a filter which may contain as much as a quart of oil as it is removed from the vehicle. The used oil will contain in addition to the expected hydrocarbons measurable quantities of heavy metals. Disposal of the used oil or oil-containing oil filters in landfills, storm drains, or in public and private places not intended as disposal sites is potentially harmful to ground water, the atmosphere, and the flora and fauna in the area.

SUMMARY OF THE INVENTION

It is accordingly an object of the invention to provide an improved system for the collection and recycle of motor oil and oil filters from households and other low volume producers not usually subject to stringent controls on disposition of waste oil. It is another object to provide a system for the temporary storage of oil filters and used oil resultant from an automobile oil change in a container in a manner which enables extensive drainage of oil from within the oil filter and which, in accordance with the invention, the oil residuum from the filter and other used oil is readily collectible to a mobile transport facility by suctioning the oil from the container. It is a further object to provide a common container for oil filters and oil therefrom and from the oil change and such a container in which the oil filter is kept separate and apart from the oil. Yet another object is to provide a bucket having an oil filter support therein which keeps the oil filter separate from the oil and positioned upright and inverted for continued drainage. Still another object of the invention is to provide a vehicle for collecting oil from a plurality of buckets stationed at curbside locations corresponding to households doing their own oil changes in succession. A further object is to provide on such vehicle a suction pump and tank means and oil filter storage means for removal of the oil and oil filter from the bucket. Another object is to provide the ability to remove the drained oil filter and to draw oil from the bucket in a controlled environment within a vehicle free of leakage of oil onto the ground and very rapidly so that little time is required to service each bucket. The buckets from household to household are identical so that the just cleared bucket can be dropped off at the next household and the bucket replaced at the present situs from the previous situs. Other objects will appear hereinafter.

These and other objects of the invention to become apparent hereinafter are realized in an apparatus for curbside motor oil and oil filter recycle and collection, the apparatus comprising a bucket having a closed end and a selectively openable end and sized to receive and contain at least one oil filter and the oil of one oil change, an oil filter support within the bucket supporting the oil filter in spaced relation to the bucket closed end and below the bucket openable end in oil draining relation into the closed end of bucket; the bucket openable end being adapted to oil filter and oil addition to and removal from the bucket in its open condition.

In this and like embodiments, the oil filter support is apertured to pass oil and retain oil filter, the oil filter support comprises an oil filter engaging structure, and an engaging structure support maintaining the engaging structure at a predetermined height within the bucket.

The foregoing curbside recycle and collection apparatus is used in combination with oil removal means for withdrawing oil from the bucket, the oil removal means comprising an oil receiver, conduit in communication with the receiver and adapted to immersion in oil within the bucket, and a suction source for drawing oil from the bucket into the receiver through the conduit. Typically, the oil removal means further includes an oil filter receiver, and includes also a vehicle for transporting the oil removal means to and from a succession of curbside oil collection apparatus.

In more particularly preferred embodiments, the bucket has a radially extended rim flange surrounding an open mouth at its openable end, and including also a closure for the mouth comprising a lid adapted to peripherally engage the mouth rim flange, the lid defining a closable opening inward of the peripheral engagement; the oil filter support is adapted to pass oil and retain oil filter; the oil filter support comprises an apertured plate congruent with the cross-section of the bucket, and there is also included also support legs maintaining the support plate at a predetermined height sufficient to permit vertical disposition of an oil filter within the bucket in inverted relation on the support plate and above oil within the bucket for draining residual oil within the filter into the bucket.

This embodiment, too, is used in combination with oil removal means for withdrawing oil from beneath the support plate disposed in the bucket, the oil removal means comprising an oil receiver, conduit in communication with the receiver and adapted to draw oil from within the bucket, and a suction source for drawing the oil through the conduit from the bucket into the receiver. In this embodiment the oil removal means further includes an oil filter receiver separate from the oil receiver, and a bucket stand adapted to stand buckets on edge for collection of maximum oil therefrom with conduit, and including also a vehicle for mounting the oil filter receiver, oil receiver, conduit, stand and suction means, in transportable relation to and from a succession of curbside oil collection apparatus.

In a further embodiment, the invention provides an apparatus for curbside oil and oil filter recycle and collection from individual households, the apparatus comprising a bucket sized to contain at least the oil filter and oil of a single oil change and having a closed end and an open end and an oil filter support therebetween adapted to support an oil filter out of contact with oil in the bucket, a lid across the bucket open end secured to the periphery of the bucket across the bucket open end, the lid defining a plug-receiving opening inwardly spaced across a land portion of the lid from the bucket periphery, the lid land portion forming a dam against oil spillage from the bucket should the bucket be tipped onto its side.

In this and like embodiments, the bucket is a plastic container resistant to deterioration in contact with oil, and may be of various sizes such as the typical 5 gallon plastic bucket, or be larger e.g. 10 gallons or more. Preferably, the bucket has a radially extended rim flange surrounding an open mouth at its openable end, and includes also a closure for the mouth comprising an annular lid having a downwardly opening peripheral channel sealably engaged with the mouth rim flange on the inside and outside of the bucket rim, an annular land extending radially inward from the channel, and a central opening, the lid central opening having a vertically extended wall defining camming lock structure; a removable plug sized to close the lid opening, the plug having camming lock structure opposed and complementary to the lid opening lock structure for tightly closing the opening with plug, the plug being insertable into the opening to close the bucket against oil flow therefrom and removable from the opening to permit addition and removal of oil filters and passage of oil removal conduit.

There is further provided an oil filter support constructed and arranged to pass oil from the filter to the bottom of the bucket and to retain the oil filter out of contact with the passed oil. The oil filter support typically comprises an oil filter engaging structure at a predetermined height sufficient to permit vertical disposition of an oil filter within the bucket in inverted relation on support plate for draining residual oil within filter into the bucket out of contact with oil, and the oil filter engaging structure comprises an apertured plate generally congruent with the bucket. In combination with the bucket there is also provided oil removal means for withdrawing oil from beneath support plate disposed in the bucket, the oil removal means comprising an oil receiver, conduit in communication with the receiver and adapted to draw oil from within the bucket, and a suction source for drawing oil through the conduit from the bucket into the receiver, oil removal means further includes an oil filter receiver and a bucket support pivotally mounting said bucket, a vehicle for transporting the oil removal means to and from a succession of curbside oil collection apparatus.

The invention further contemplates the method for curbside collecting and recycling of oil filters and oil from a plurality of individual locations including supporting an oil filter inverted on a draining support above an oil reservoir in a common container with the oil filter and out of contact with its drained oil, shifting the container to a transportation vehicle having oil suction conduit, oil collection and oil filter collection receptacles, removing contained oil filters from the container to oil filter collection receptacles, standing the container on a stand on the vehicle, removing container contained oil with suction conduit, the oil withdrawal and filter removal being accomplished without inverting the container, and repeating the steps at additional locations with different containers and a common vehicle.

In this and like embodiments the method includes providing a 5 to 10 or more gallon bucket as the common container, providing a perforate support within the bucket to support the oil filter in draining relation out of contact with the drained oil, the suction conduit and support cooperating to permit withdrawal of drained oil freely of inverting the bucket.

BRIEF DESCRIPTION OF THE DRAWINGS

The invention will be further described in conjunction with the attached drawings in which.

DESCRIPTION OF THE PREFERRED EMBODIMENTS

Figure 1:
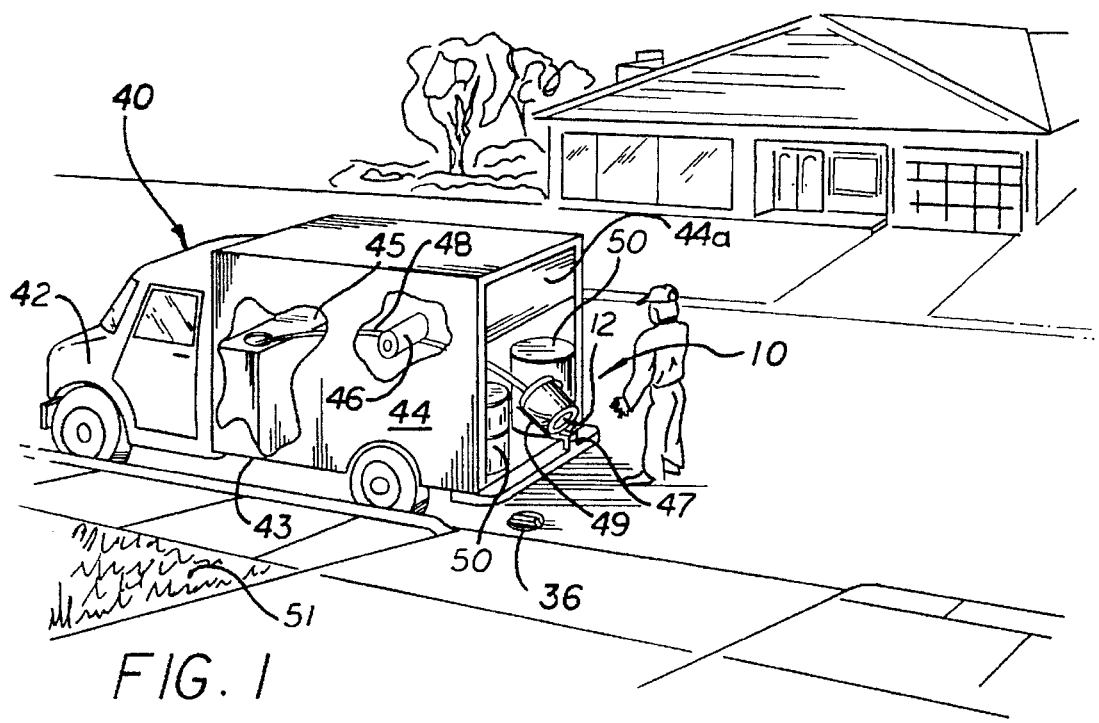
FIG. 1 is a perspective view of the curbside collection apparatus and transportation vehicle.

With reference now to the drawings in detail, in FIGS. 2, 3, 4 and 7, the oil collection apparatus is shown at 10 to comprise in part a common container 8 for an oil filter and the used oil obtained from an oil change including that residual in the filter. The common container 8 comprises a bucket 12 having a closed end 14 and a selectively openable end 16. The bucket 12 is sized to receive and contain at least one oil filter and the oil of one oil change, and preferably is at least a 5 to 10 gallon bucket, or larger, and is able to receive a pair of oil filters 18 and the oil 20 of two oil changes. Within the bucket 12 which normally stands upright on its closed end 14 there is horizontally disposed in parallel plane with the top and bottom of the bucket 12 an oil filter support 22 in the form of a plate 24 congruent with the bucket and supported in notches 26 of three legs 28 which extend vertically in the bucket along the inner side 30 thereof. The oil filters 18 rest inverted (open end down) on the support plate 24 spaced from the bucket closed end 14 and the oil 20 therein. Support plate 24 has numerous apertures 24a distributed across its diametrical extent, formed by perforating a solid plate, forming the plate from grid material, or from screening material or by other expedient means providing ample drainage ports through the plate. The oil filters 18 thus drain freely while inverted which would not occur if the oil filters were immersed even partially in the oil 20. The drained oil filters 18 when recovered can be processed into disposable waste. Support plate 24 has at least one relatively enlarged opening 24b for purposes to appear, See FIG. 7.

The bucket 12 openable end 16 is closed by a lid 32 to be described in detail below, but which has a center opening 34 and a removable plug 36 lockable therein to permit access into the bucket interior 38 for purposes of adding and removing oil and filters as will described hereinafter.

Figure 4:
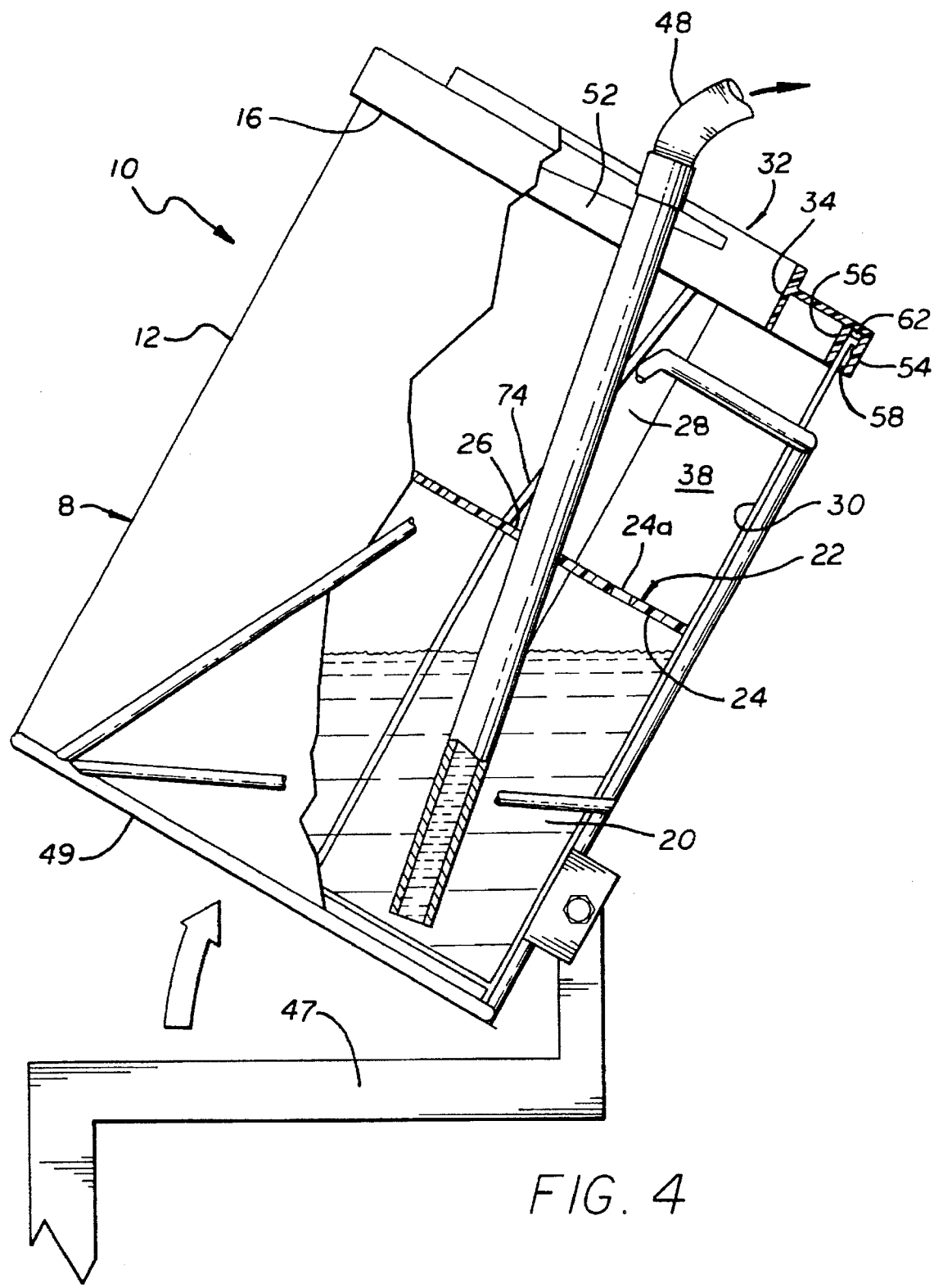
FIG. 4 is a view of the common container or bucket, support plate and lid assembly on a pivoting stand with the lid plug removed for withdrawal of the residual oil via suction conduit.
Figure 5:
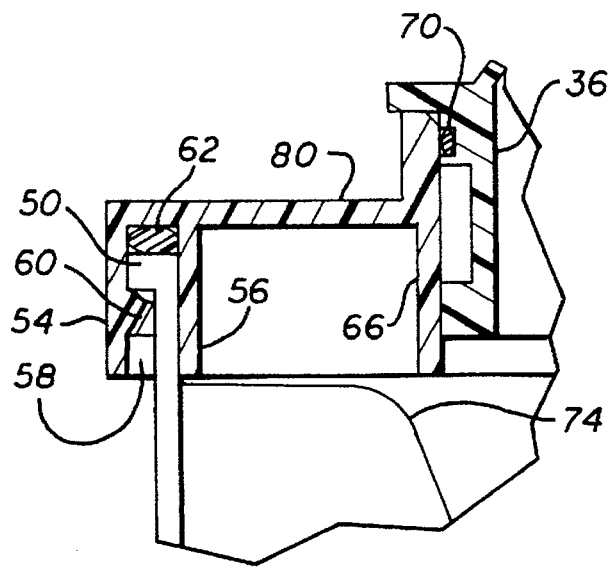
FIG. 5 is a view taken on line 5 in FIG. 3.
Figure 6:
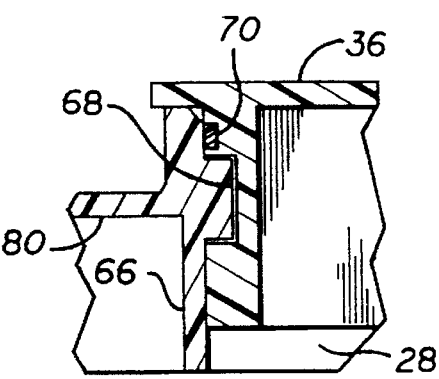
FIG. 6 is a view taken on line 6—6 in FIG. 3.
Figure 8:
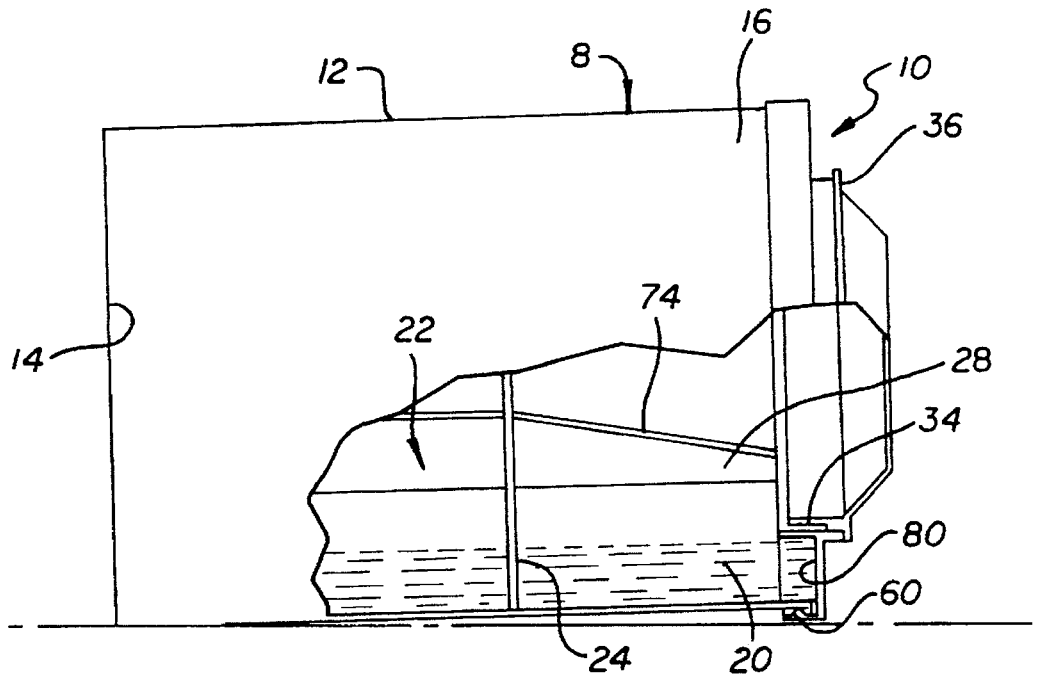
Figure 7:
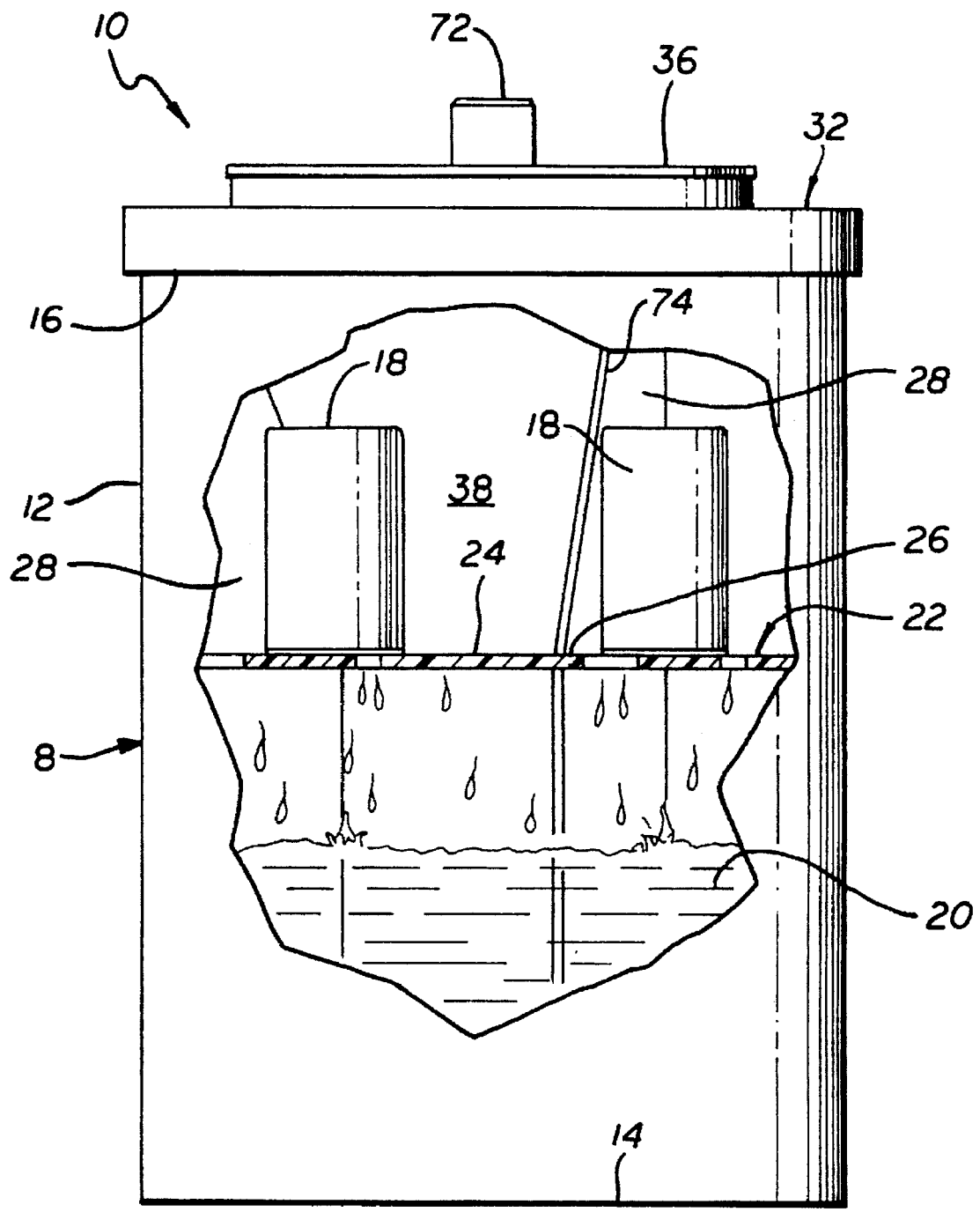
FIG. 7 is a front elevation view of the bucket, partly broken away to show oil filters within in draining position; and, FIG. 8 is a front elevation view of the bucket, tipped on its side, also broken away to show containment of oil within the tipped bucket.

With reference to FIGS. 1 and 4, in particular, the oil collection apparatus 10 is shown to further comprise in addition to the oil collection bucket 12 an oil removal vehicle shown as a route truck 40 but which can be any mobile collector suited to going from site to site for curbside oil collection. The truck 40 comprises a cab portion 42 and a flatbed portion 43 on which an enclosure 44 having door 44a is mounted. Within the truck enclosure 44 there is a used oil storage receptacle 45 having a pump 46 thereon communicating through conduit 48 the receptacle and bucket 12 held tipped on stand 49 pivoted on bracket 47. In addition, to the left and right of stand 49 a pair of fifty-five gallon drums are arranged to be used as oil filter receptacles 50. In use, and with further reference to FIG. 1 and FIG. 7, the curbside bucket 12 placed by the homeowner at a locus such as 51 is taken with its load of used oil 20 and used oil filters 18 and shifted to the truck 40, mounted on the stand 49, thereby tipping the bucket. The plug 36 is then unscrewed from the lid 32. The used oil filters 18 are then removed from the bucket 12 through lid opening 34 to one of the drum receptacles 50. Suction conduit 48 is inserted through the bucket lid opening 34, passed through enlarged opening 24b in support plate 24, and into the pool of used oil 20. Typically, at the time of oil collection it will have been a matter of one or more days since the oil filters 18 were placed in the bucket 12 so that most oil will have drained from the oil filters. Suction in conduit 48 from operation of pump 46 draws the oil 20 from bucket 12 into the storage receptacle 45 of truck 40. Pump 46 has a suitable capacity such as thirty gallons per minute and is thus adapted to rapidly empty the bucket 12 which will usually contain a maximum of only several gallons of oil at most. Based on up to ten or twelve quarts of oil in the bucket 12, the pump 46 will extract this amount of oil in less than a minute, enabling the vehicle operator to rapidly service the bucket 12 and efficiently proceed along a route of many stops where buckets 12 are set out for servicing. The service operator will leave a bucket 12 at the site. This may be the same or preferably another bucket which had been picked up earlier and emptied. Thus the bucket 12 may be left in the truck 40 and itself placed at the next stop location. After collection, the householder returns the bucket 12 to his garage or other suitable place until the next oil change(s) and collection time.

The described arrangement minimizes possibilities for loss of oil onto the ground.

With reference to FIGS. 2-8, the invention curbside recycle and collection apparatus bucket 12 has a radially extended rim flange 50 surrounding the bucket open mouth 52 at the bucket openable end 16. Lid 32 is generally circular and formed with opposed inner and outer perimeter walls 54, 56 defining a downwardly open channel 58 which receives flange rim 50. Channel 58 has an interior rib 60 which overcenter locks the flange rib 50 into the channel. Gasket 62 seals the flange rim 50 in the channel 58 against oil or vapor leakage from the bucket 12.

Figure 2:
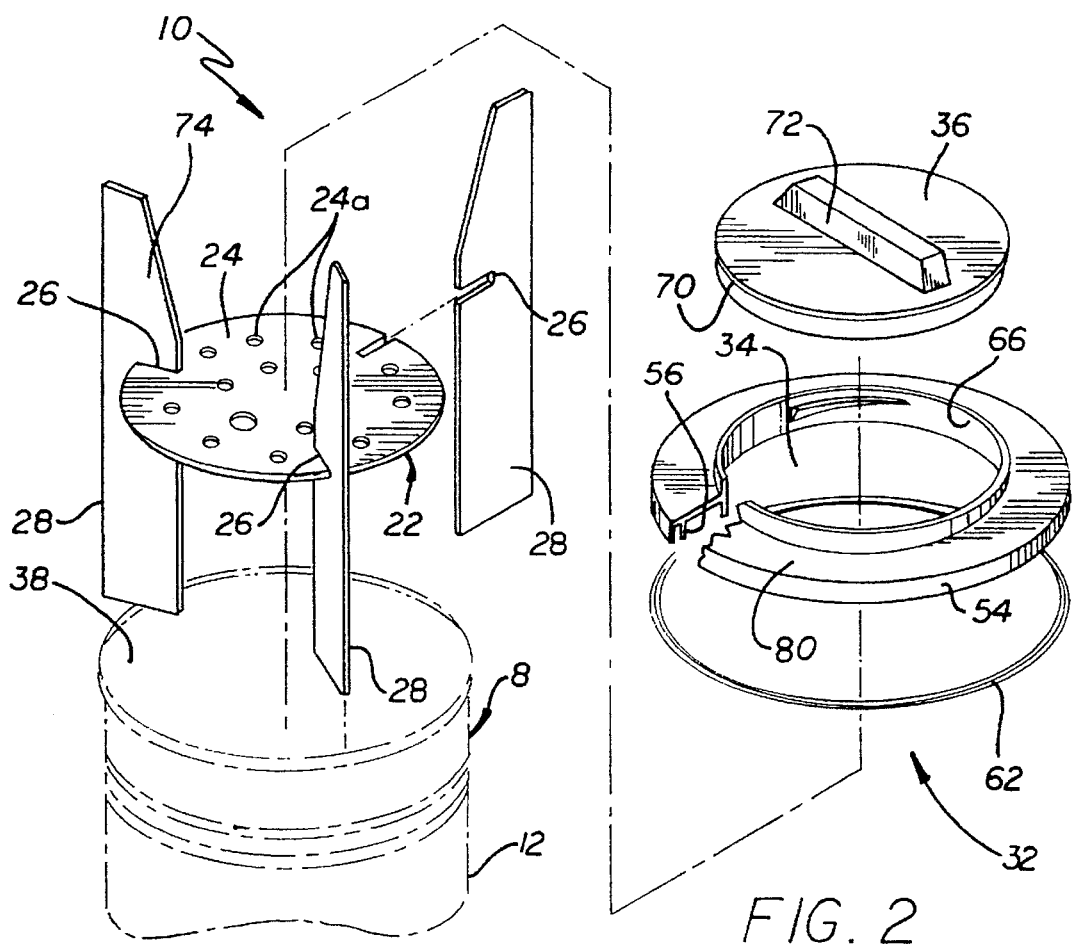
FIG. 2 is an exploded view of the common container, support plate and lid assembly.
Figure 3:
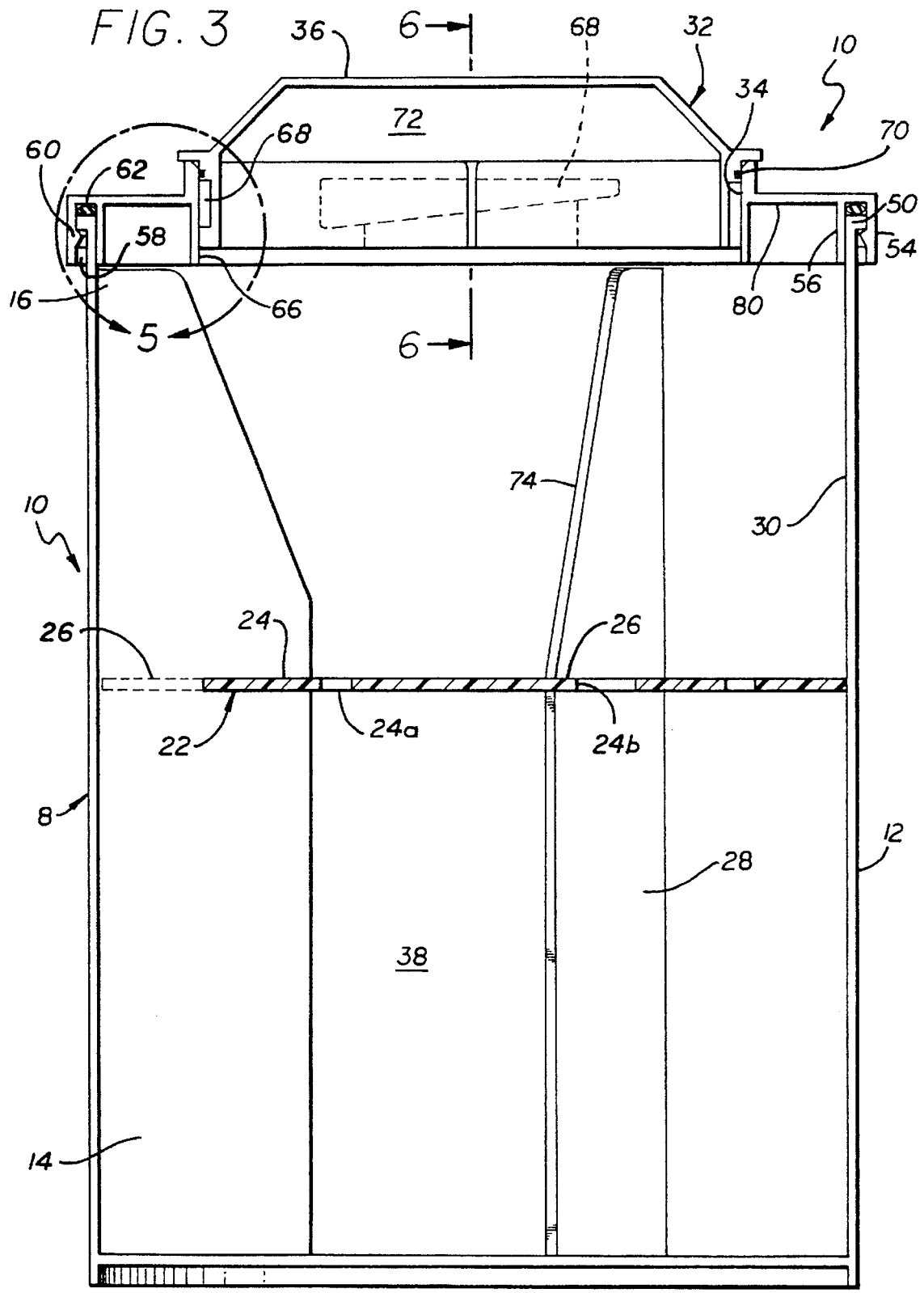
FIG. 3 is a view in vertical section of the common container, support plate and lid assembly.

Lid 32 further has a third wall 66 comprising a downwardly extending annular structure spaced inward a substantial distance, e.g. a distance equal to one-quarter to one-third or more of the radius of the lid defining the lid center opening 34 and mounting the removable plug 36. Lid center opening 34 is large enough to permit easy insertion and removal of oil filters 18 and ready insertion and withdrawal of the suction conduit 48. It will be noted that legs 28 are upwardly tapered at 74 to increase the volume available at the opening 34 for oil filters 18 while maintaining sufficient material below the support plate 24 to adequately support the oil filters in draining position. Plug 36 and wall 66 are typically given cooperating camming structure such interlocking threads or pin and slot structure 68 (FIGS. 3 and 6) for locking the plug in place, sealed with O-ring 70, while permitting rapid removal of the plug by rotating the plug by its diametrically disposed boss 72 (FIG. 2).

It will be noted that the lid 32 design just described affords a substantial radial land 80 all around the opening 34 integrally formed with the wall 66 and generally all of lid 32. The land 80 is intended to and functions to catch oil 20 otherwise reaching the lid 32 in the absence of as extensive a land surrounding the central opening 34 as occurs when the bucket 12 is upset and rests on its side. See FIG. 8. In this manner there is less reliance on the lid 32 seal to the wall 66 in preventing spillage.

As noted above, bucket 12 is conveniently a commercially available plastic pail or container resistant to deterioration in contact with oil, of preferably 5 to 10 gallon size or larger.

The invention thus includes for curbside collecting and recycling of oil filters and oil from a plurality of low volume, individual, e.g. residential, locations, supporting an oil filter inverted on a draining support above an oil reservoir in a common typically closed container and out of contact with the filter-drained residual oil, withdrawing drained residual oil to a receptacle carried on a collection and transportation vehicle by suction conduit passed through the draining support to the residual oil, removing the oil filters to receptacles, the oil withdrawal and filter removal being accomplished in an enclosed area to minimize possible spillage, and repeating the steps at additional locations with different containers and a common vehicle.

The foregoing objects of the invention are thus met, including provision of an improved system for the collection and recycle of motor oil and oil filters from households and other low volume producers not usually subject to stringent controls on disposition of waste oil, provision of a system for the temporary storage of oil filters and used oil resultant from an automobile oil change in a container in a manner which enables extensive drainage of oil from within the oil filter and which in accordance with the invention the oil residuum from the filter and other used oil is readily collectible in a mobile transport facility by suctioning the oil from the container, provision of a common container for oil filters and oil therefrom and from an oil change, in which the oil filter is kept separate and apart from the oil, provision of a simple bucket having an oil filter support therein which keeps the oil filter separate from the oil and positioned upright and inverted for continued drainage, provision of a vehicle for collecting oil from a plurality of buckets stationed at curbside locations corresponding to households doing their own oil changes, in succession, the vehicle having a suction pump and tank means and conduit which extends from the vehicle tank to the bucket oil for removal of the oil from the container, and provision of a recycle and collection system having the ability to remove the drained oil filter and to draw oil from the bucket in an enclosed, mobile vehicle.

The invention claimed is:

1. An apparatus for motor oil and oil filter collection, said apparatus comprising a bucket having a one-piece unitary generally cylindrical wall extended along a central vertical axis to a height greater than its diameter, said bucket having a closed end bottom centered on said vertical axis and a single opening into said bucket at the other end of said bucket, a rim flange surrounding said bucket single opening, and a closure for closing said bucket single opening comprising a removable lid adapted to engage said rim flange, said single opening being selectively openable by separation of said lid and sized to receive and contain at least one oil filter and the oil of one oil change, an oil filter support within said bucket comprising an opening-defining plate supported within and surrounded by said bucket cylindrical wall parallel to said bucket bottom and said bucket single opening and located therebetween centered on said vertical axis, said plate being below said removable lid to remain in place when said lid is removed and at a height sufficient to permit disposition of an oil filter within said bucket on said plate in spaced relation to said bucket bottom for oil filter draining into said bucket bottom; said bucket openable end being the sole means to allow oil filter and oil addition to and removal from said bucket in its open condition.

2. The collection apparatus according to claim 1, in which said oil filter support plate defines openings distributed substantially coextensively across said plate adapted to pass oil and retain said oil filter.

3. The collection apparatus according to claim 1, including also a separate support within said bucket supporting said oil filter support plate spaced from the bottom of said bucket.

4. In combination: An apparatus for motor oil and oil filter collection comprising a generally cylindrical bucket extended along a central vertical axis to a height greater than its diameter, said bucket having a closed bottom at one end centered on said vertical axis and a single opening into said bucket at the other end of said bucket, said single opening being selectively openable and sized to receive and contain at least one oil filter and the oil of one oil change, an oil filter support within said bucket generally parallel to said bucket bottom and said bucket opening and located therebetween and centered on said vertical axis, said oil filter support supporting the oil filter in spaced relation to said bucket bottom and at least partially below said bucket openable end in oil draining relation into said bucket bottom; said bucket openable end being the sole means to allow oil filter and oil addition to and removal from said bucket in its open condition; and oil removal means for withdrawing oil from said bucket, said oil removal means comprising an oil receiver, a conduit selectively in communication with said receiver and adapted for immersion in oil within said bucket, and a suction source for drawing oil from said bucket into said receiver through said conduit.

5. An apparatus for motor oil and oil filter collection, said apparatus comprising a bucket having a closed end and a selectively openable end and sized to receive and contain at least one oil filter and the oil of at least one oil change, an oil filter support within said bucket supporting the oil filter in spaced relation to said bucket closed end and below said bucket openable end in oil draining relation into said closed end of said bucket, said bucket openable end being adapted to allow oil filter and oil addition to and removal from said bucket in its open condition; oil removal means for withdrawing oil from said bucket, said oil removal means comprising an oil receiver, an oil filter receiver, a conduit in communication with said receiver and adapted for immersion in oil within said bucket, and a suction source for drawing oil from said bucket into said receiver through said conduit, and a vehicle for transporting said oil removal means to and from a succession of oil collection apparatus.

6. An apparatus for motor oil and oil filter collection, said apparatus comprising a bucket having a closed end bottom and a single, selectively openable end at opposite ends of a bucket central vertical axis, and a one-piece unitary generally cylindrical wall therebetween, said bucket opening being sized to receive and contain at least one oil filter and the oil of one oil change, an oil filter support within said bucket comprising an opening-defining plate centered on said axis in contact with said bucket wall for supporting the oil filter in spaced relation to said bucket closed end bottom and at least partially below said bucket openable end in oil draining relation into said closed end of said bucket; said bucket openable end being adapted to allow oil filter and oil addition to and removal from said bucket in its open condition, said bucket having a rim flange surrounding an open mouth at its said openable end, and a closure for said mouth comprising a removable lid adapted to engage said mouth rim flanges, said oil filter support plate being within said bucket one-piece unitary cylindrical wall and spaced from said removable lid against separation from said bucket when said lid is removed.

7. The collection apparatus according to claim 6, in which said oil filter support plate is apertured to define openings substantially all across its extent to pass oil while retaining said oil filter.

8. The oil and oil filter collection apparatus according to claim 6, in which said bucket is a plastic container resistant to deterioration in contact with oil.

9. The oil and oil filter collection apparatus according to claim 8, in which said bucket is a 5 to 10 gallon plastic bucket.

10. An apparatus for motor oil and oil filter collection, said apparatus comprising a bucket having a one-piece unitary generally cylindrical wall extended along a central vertical axis to a height greater than its diameter, said bucket having a closed end bottom centered on said vertical axis and a single opening into said bucket at the other end of said bucket, said single opening being selectively openable and sized to receive and contain at least one oil filter and the oil of one oil change, a removable lid for closing said bucket single opening, an oil filter support within said bucket below and free of attachment to said removable lid against removal from said bucket with said lid and generally parallel to said bucket bottom and said bucket opening and located therebetween and centered on said vertical axis, said oil filter support supporting the oil filter in spaced relation to said bucket bottom and below said bucket removable lid; said bucket opening being the sole means to allow oil filter and oil addition to and removal from said bucket in its open condition, said oil filter support comprising an opening defining plate disposed transversely of said bucket, said oil filter support plate being supported within said bucket and surrounded by said bucket wall below said removable lid for maintaining said plate at a height sufficient to permit disposition of an oil filter within said bucket on said plate and above oil within said bucket for draining residual oil from said filter into said bucket.

11. The collection apparatus according to claim 10, in combination with oil removal means for withdrawing oil from beneath said support plate disposed in said bucket, said oil removal means comprising an oil receiver, a conduit selectively in communication with said receiver and adapted to draw oil from within said bucket, and an oil suction source for drawing said oil through said conduit from said bucket into said receiver.

12. The combination according to claim 11, in which said oil removal means further includes an oil filter receiver separate from said oil receiver, and a bucket stand adapted to stand said buckets on edge for collection of maximum oil therefrom with said conduit, and including also a vehicle for mounting said oil filter receiver, said oil receiver, said conduit, said stand and said suction means, in transportable relation to and from a succession of oil collection apparatus.

13. An apparatus for oil and oil filter collection from individual households, said apparatus comprising a bucket sized to contain at least the oil filter and oil of a single oil change and having a closed end and an open end and a generally cylindrical wall therebetween about a vertical central axis, an oil filter support between said bucket open and closed ends centered on said central axis in contact with said wall and adapted to support an oil filter out of contact with oil in said bucket, a lid secured to the periphery of said bucket across the bucket open end, said lid defining an opening inwardly spaced across a land portion of said lid from said bucket periphery, said lid land portion forming a dam against oil spillage from said bucket should the bucket be tipped onto its side, said bucket having a radially extended rim flange surrounding an open mouth at its openable end, a closure for said mouth comprising an annular lid having a downwardly opening peripheral channel sealably engaged with said mouth rim flange on the inside and the outside of said bucket rim, said lid land being annular and extending radially inward from said channel, and defining a central opening in said lid, said lid central opening having a vertically extended wall defining camming lock structure; a removable plug sized to close said lid opening, said plug having camming lock structure opposed and complementary to said lid opening lock structure for tightly closing said lid central opening with said plug, said plug being insertable into said opening to close said bucket against oil flow therefrom and removable from said opening to permit addition and removal of oil filters.

14. The oil and oil filter collection apparatus according to claim 13, in which said oil filter support comprises an apertured plate constructed and arranged to pass oil from said filter to the bottom of said bucket while retaining said oil filter out of contact with said passed oil.

15. The oil and oil filter collection apparatus according to claim 13, in which said oil filter support comprises an oil filter engaging structure at a predetermined height sufficient to permit vertical disposition of an oil filter within said bucket in inverted relation for draining residual oil within filter into said bucket out of contact with said oil.

16. The oil and oil filter collection apparatus according to claim 13, in which said oil filter support comprises an opening defining plate generally congruent with said bucket, and in combination with oil removal means for withdrawing oil from beneath said support plate disposed in said bucket, said oil removal means comprising an oil receiver, conduit in communication with said receiver and adapted to draw oil from within said bucket, and a suction source for drawing said oil through said conduit from said bucket into said receiver.

17. An apparatus for oil and oil filter collection from individual households, said apparatus comprising a bucket sized to contain at least the oil filter and oil of a single oil change and having a closed end and an open end and an oil filter support therebetween adapted to support an oil filter out of contact with oil in said bucket, a lid secured to the periphery of said bucket across the bucket open end, said lid defining a plug-receiving opening inwardly spaced across a land portion of said lid from said bucket periphery, said lid land portion forming a dam against oil spillage from said bucket should the bucket be tipped onto its side, said oil filter support being constructed and arranged to pass oil from said filter to the bottom of said bucket and to retain said oil filter out of contact with said passed oil, said oil filter support comprising an oil filter engaging structure comprising an apertured plate generally congruent with said bucket, and in combination with oil removal means for withdrawing oil from beneath said support plate disposed in said bucket, said oil removal means comprising an oil receiver, conduit in communication with said receiver and adapted to draw oil form within said bucket, and a suction source for drawing said oil through said conduit from said bucket into said receiver, said oil removal means further including an oil filter receiver, and a vehicle for transporting said oil removal means to and from a succession of oil collection apparatus.

18. A method for collecting and recycling of oil filters and oil from a plurality of individual locations including supporting an oil filter inverted above an oil reservoir in a common container with said oil filter and out of contact with its drained oil, shifting said container to a transportation vehicle providing oil suction conduit, oil collection and oil filter collection receptacles on said transportation vehicle, removing contained oil filters from said container to said oil filter collection receptacles, standing said container on a stand on said vehicle, removing container contained oil with said suction conduit, said oil withdrawal and filter removal being accomplished without inverting said container, and repeating said steps at additional locations with different containers and a common vehicle.

19. The method according to claim 18, including providing a bucket as said common container, providing a perforate support within said bucket to support said oil filter in draining relation out of contact with said drained oil, said suction conduit and support cooperating to permit withdrawal of drained oil freely of inverting said bucket or removing said bucket from its location.

* * * * *